(12) United States Patent
Schneider (10) Patent No.: US 7,970,857 B2
(45) Date of Patent: Jun. 28, 2011

(54) METHOD AND AN APPARATUS TO RECORD WEB TRANSACTIONS USING A PROXY SERVER

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 328 days.

(21) Appl. No.: 11/804,702

(22) Filed: May 18, 2007

(65) Prior Publication Data
US 2008/0288581 A1 Nov. 20, 2008

(51) Int. Cl.
*G06F 15/16* (2006.01)
(52) U.S. Cl. .......................... 709/217; 709/219; 709/227
(58) Field of Classification Search .......... 709/200–203, 709/217–227, 238
See application file for complete search history.

(56) References Cited

U.S. PATENT DOCUMENTS

| | | | |
|---|---|---|---|
| 5,737,517 A | 4/1998 | Kite et al. | |
| 5,838,919 A | 11/1998 | Schwaller et al. | |
| 6,189,031 B1 | 2/2001 | Badger et al. | |
| 6,219,803 B1 * | 4/2001 | Casella et al. | 714/38 |
| 6,920,502 B2 | 7/2005 | Araujo | |
| 6,963,996 B2 * | 11/2005 | Coughlin | 714/4 |
| 6,981,041 B2 | 12/2005 | Araujo | |
| 7,043,546 B2 * | 5/2006 | Smith et al. | 709/224 |
| 7,111,060 B2 | 9/2006 | Araujo | |
| 7,269,633 B2 * | 9/2007 | Allan | 709/217 |
| 7,349,867 B2 * | 3/2008 | Rollins et al. | 705/26 |
| 7,392,321 B1 * | 6/2008 | Wolf et al. | 709/232 |
| 7,415,429 B2 * | 8/2008 | Rollins et al. | 705/27 |
| 7,481,361 B2 * | 1/2009 | Dickerson et al. | 235/379 |
| 7,519,702 B1 * | 4/2009 | Allan | 709/224 |
| 2004/0143931 A1 * | 7/2004 | Dennis | 15/414 |
| 2004/0225999 A1 | 11/2004 | Nuss | |
| 2004/0267820 A1 * | 12/2004 | Boss et al. | 707/104.1 |
| 2006/0005079 A1 | 1/2006 | Kaplan et al. | |
| 2006/0085537 A1 * | 4/2006 | Dickerson et al. | 709/224 |
| 2007/0050844 A1 * | 3/2007 | Lebel | 726/13 |
| 2007/0069005 A1 * | 3/2007 | Dickerson et al. | 235/379 |
| 2008/0065702 A1 * | 3/2008 | Dickerson et al. | 707/202 |
| 2008/0133210 A1 * | 6/2008 | Chagoly et al. | 703/22 |
| 2009/0095807 A1 * | 4/2009 | Dickerson et al. | 235/379 |

OTHER PUBLICATIONS

Simple Network Management Protocol from Wikipedia http://en.wikipedia.org/wiki/SMNP. Oct. 31, 2007. 12 pages.
Redhat Command Center. Redhat.com. http://www.redhat.com/command_center. Sep. 18, 2007. 4 pages.
Hypertext Transfer Protocol—HTTP/1.1, The Secure Hypertext Transfer Protocol. Jun. 1999, 114 pages.
HMAC: Keyed-Hashing for Message Athentication. Feb. 1997. 11 pages.
The Advanced Encryption Standard-Cipher-based Message Authentication Code-Pseudo-Random Function-128. Aug. 2006. 7 pages.
HTTP Over TLS. May 2000. 7 pages.

(Continued)

*Primary Examiner* — Moustafa M Meky
(74) *Attorney, Agent, or Firm* — Lowenstein Sandler PC (57) ABSTRACT

Some embodiments of a method and an apparatus to record web transactions in a proxy server have been presented. In one embodiment, responses and requests are routed between a web server and a client via a proxy server communicatively coupled between the web server and the client during a web transaction. The proxy server further records transaction information of the web transaction.

18 Claims, 5 Drawing Sheets

OTHER PUBLICATIONS

The Transport Layer Security (TLS) Protocol Version 1.1, Apr. 2006. 82 pages.
HTTP Authentication: Basic and Digest Access Authentication. Jun. 1999. 32 pages.
Hypertext Transfer Protocol (HTTP) Digest Authentication Using Authentication and Key Agreement (AKA) Version-2. Nov. 2005. 13 pages
http://jakarta.apache.org/jmeter/. 2 pages.
http://www.aepnetworks.com/ AEP Netilla Security Platform (NSP). 2 pages.
http://httpd.apache.org/docs/2.0/. 192 pages.
Tsai, W. T., et al., "Verification of Web Services Using an Enhanced UDDI Server," Proceedings of the 8th IEEE Int'l. Workshop on Object-Oriented Real-Time Dependable Systems, pp. 131-138, Jan. 2003 (8 pgs.).
Final Office Action for U.S. Appl. No. 11/985,670, mailed Mar. 29, 2010.
Office Action for U.S. Appl. No. 11/985,670, mailed Oct. 2, 2009.
Advisory Action for U.S. Appl. No. 11/985,670, mailed May 26, 2010 (3 pgs.).
Red Hat Office Action for U.S. Appl. No. 11/985,670, mailed Oct. 2, 2009.

* cited by examiner

METHOD AND AN APPARATUS TO RECORD WEB TRANSACTIONS USING A PROXY SERVER

TECHNICAL FIELD

Embodiments of the present invention relate to web transactions, and more specifically to recording web transactions using a proxy server.

BACKGROUND

As the use of the Internet is becoming more popular, more web applications are deployed. An application as used herein generally refers to a program or a suite of programs executable by one or more processors to perform tasks and/or functions. A network access application generally refers to an application that accesses a network (e.g., an intranet, the Internet, etc.) to send and/or receive data, such as a browser, an electronic mail engine, etc. A web application broadly refers to an application accessible with a network access application over a network (e.g., an intranet, the Internet, etc.). A web server at the backend typically executes the web application, while the network access application acts as a client (also referred to as a thin client) at the front end. One conventional practice in providing web applications is to use a proxy server (also referred to as a web proxy) to interface between the browser and the web server. Conventionally, the proxy server passively forwards requests and/or responses between the web server and the browser.

A web transaction generally refers to a sequence of requests made by a client, typically via a network access application, over a network to remotely access a web application. It is often useful to collect information about web transactions for monitoring and testing web applications. Currently, a browser plugin may be installed on the client to collect information on a sequence of operations done to perform a web transaction against the web application (e.g., logging in and starting a particular web application). However, this conventional approach requires the user on the client side to install the plugin and to maintain the plugin, which may impose a lot of undesirable hassles on the user. In addition to requiring installation and maintenance of the plugin on the client, the plugin may also be specific to a single, proprietary network access application. Thus, the user has to install multiple plugins if the user wants to use different browsers from different vendors.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method and an apparatus to record web transactions in a proxy server. As mentioned above, a web transaction generally refers to a sequence of requests made by a client, typically via a network access application (e.g., a browser), over a network to remotely access a web application. In one embodiment, responses and requests are routed between a web server and a client via a proxy server communicatively coupled between the web server and the client during a web transaction. The proxy server records transaction information of the web transaction. Transaction information as used herein broadly refers to information related to a web transaction. Some examples of transaction information include the addresses of webpages accessed during the web transaction, a sequence or order in which the webpages are accessed during the web transaction, data entered at the client during the web transaction, etc. More details of some embodiments of the recording of web transactions using the proxy server are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 1A:
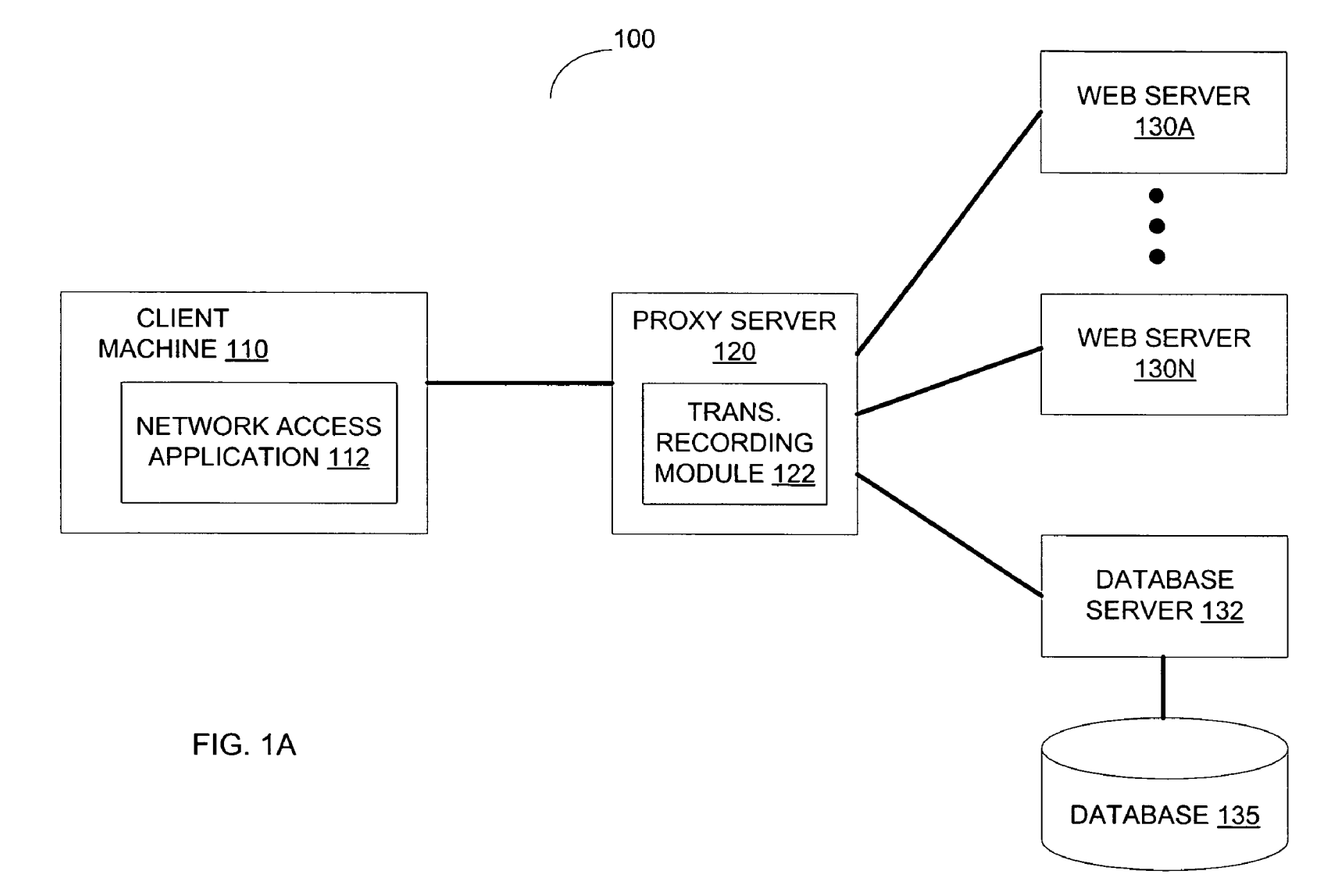
FIG. 1A illustrates one embodiment of a system in which embodiments of the present invention may be implemented.

FIG. 1A illustrates one embodiment of a system in which embodiments of the present invention may be implemented. The system 100 includes a client machine 110, a proxy server 120, a number of web servers 130A-130N, a database server 132, and a database 135. The client machine 110 is coupled to the proxy server 120, which is further coupled to the web servers 130A-130N and the database server 132. The database server is further coupled to the database 135. The client machine 110 may include a computing machine, such as a desktop personal computer (PC), a laptop PC, a personal digital assistant (PDA), a mobile telephone, etc. A network access application 112 (e.g., a browser, an electronic mail engine, etc.) is executable on the client machine 110. The proxy server 120 may be implemented using a computing machine, such as the one illustrated in FIG. 4. The proxy server 120 is further coupled to some web servers 130A-130N and the database server 132. The web servers 130A-130N may communicate with the client machine 110 via the proxy server 120, which serves as a gateway. The client machine 110, the proxy server 120, the web servers 130A-130N, the database server 132, and the database 135 may be coupled to each other via one or more networks, such as an intranet, the Internet, etc.

Figure 1B:
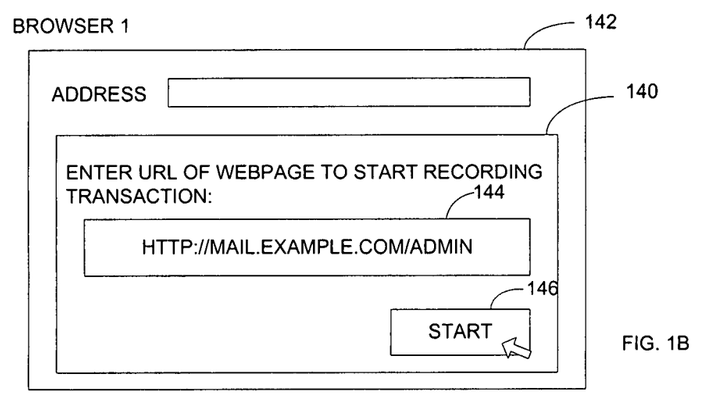
FIGS. 1B-1D illustrate various embodiments of a user interface used in recording web transactions.

Note that any or all of the components of the system 100 and associated hardware may be used in various embodiments of the present invention. However, it can be appreciated that other configurations of the system 100 may include more or fewer devices than those discussed above In some embodiments, a user of the client machine 110 accesses a web application provided by a web server, such as web server 130A. The user may access the web application in order to carry out a web transaction against the web application. For quality assurance purposes (e.g., debugging the web application), it is useful to have information on the web transaction so that the web transaction may be played back if needed. In order to collect information on the operations performed to carry out a web transaction against the web application (e.g., logging in to start the web application over an intranet), the user may initiate web transaction recording by submitting a request to the proxy server 120. For example, the user may enter an address of the web application in a user interface (e.g., a text entry field in a first browser window) and actuate a user interface control (e.g., clicking a button) to submit the address. The address of the web application typically includes a universal resource locator (URL). One example of the user interface is illustrated in FIG. 1B. Referring to FIG. 1B, a user interface 140 is presented via a browser window 142. The user interface 140 includes a text entry field 144 for the user to enter the URL of the web application, http://mail.example.com/admin. The user interface 140 further includes a START button 146. The user may click on the START button 146 to submit a request to the proxy server 120 to initiate recording of a web transaction with the web application.

Figure 1C:
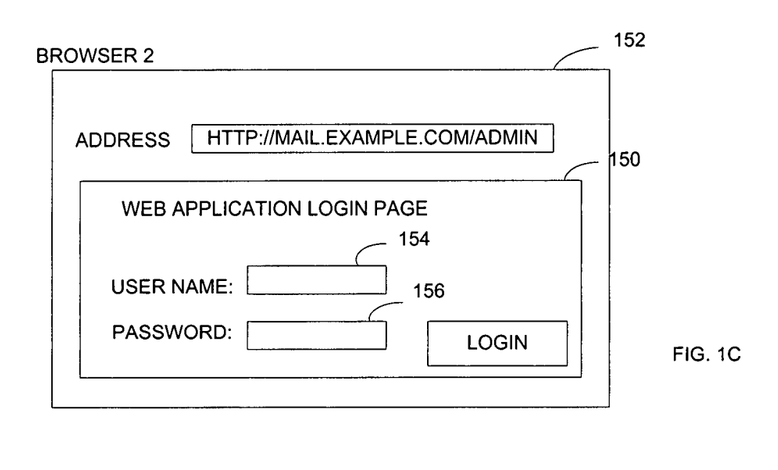

In response to the request, the proxy server 120 causes the network access application 112 to open a second browser window for the web transaction recording. One example of the second browser window 152 is shown in FIG. 1C. The second browser window 152 points to the proxy server 120, which is now active. The proxy server 120 receives requests from the second browser window 152 and translates the requests so that the requests may be sent to the appropriate web server 130A. The proxy server 120 also translates responses from the web server 130A and sends the responses to the client 110. In addition, the transaction recording module 122 records URLs of web pages accessed during the web transaction, the sequence in which the web pages are accessed, and data sent from the client 110 to the web server 130A, such as data entered by the user via the second browser window 152 (e.g., credentials of the user). For example, referring back to FIG. 1C, the user may enter a user name and a password in the text entry fields 154 and 156, respectively. The transaction recording module 122 records the user name and password entered.

Figure 1D:
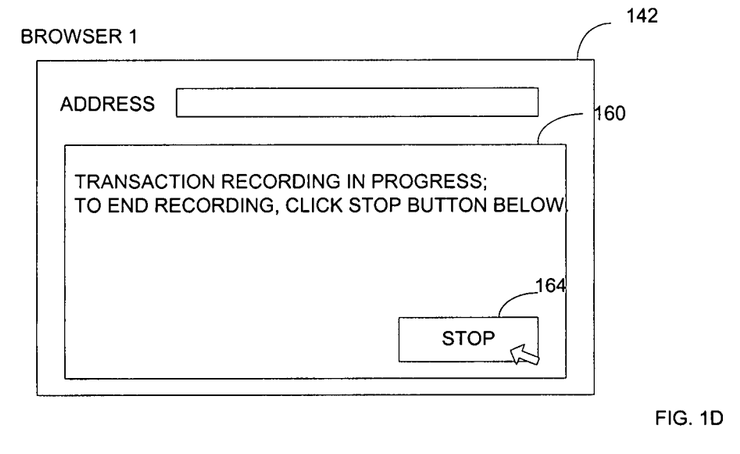

When the user desires to terminate the recording, the user may actuate another user interface control to send a request to terminate the recording to the proxy server 120. Referring back to the above example, the first browser window 142 may present a second user interface display 160, including a STOP button 164, as illustrated in FIG. 1D after the user has actuated the START button 146 in FIG. 1B. The user may click the STOP button 164 in the first browser window 142 in FIG. 1D to request terminating the transaction recording. In response to the request, the proxy server 120 terminates the transaction recording. The proxy server 120 may store transaction information recorded locally in a storage device and/or in the database 135 external to the proxy server 120.

The transaction information recorded may be used to playback the web transaction. Playing back the web transaction generally refers to repeating the web transaction in substantially the same manner as the web transaction has been carried out earlier. For example, a web agent may access the web pages accessed by the user and input the same data entered by the user earlier during the web transaction based on the transaction information. In some embodiments, the proxy server 200 plays back the earlier web transaction based on the transaction information. The web agent may be executed on the proxy server 120. Alternatively, a web agent being executed on a different server plays back the web transaction based on the transaction information.

Note that the recording of the web transaction described above may be done over secured connections and/or non-secured connections between the client 110, the proxy server 120, and the web server 130A. One example of a secured connection is a secure hypertext transfer protocol (HTTPS) connection. In some embodiments, where sensitive and/or private data is entered during the web transaction (e.g., passwords to log into a bank account, personal information, such as credit card numbers, social security number, etc.), the above web transaction recording may be performed over secured connections to protect the data.

Figure 2:
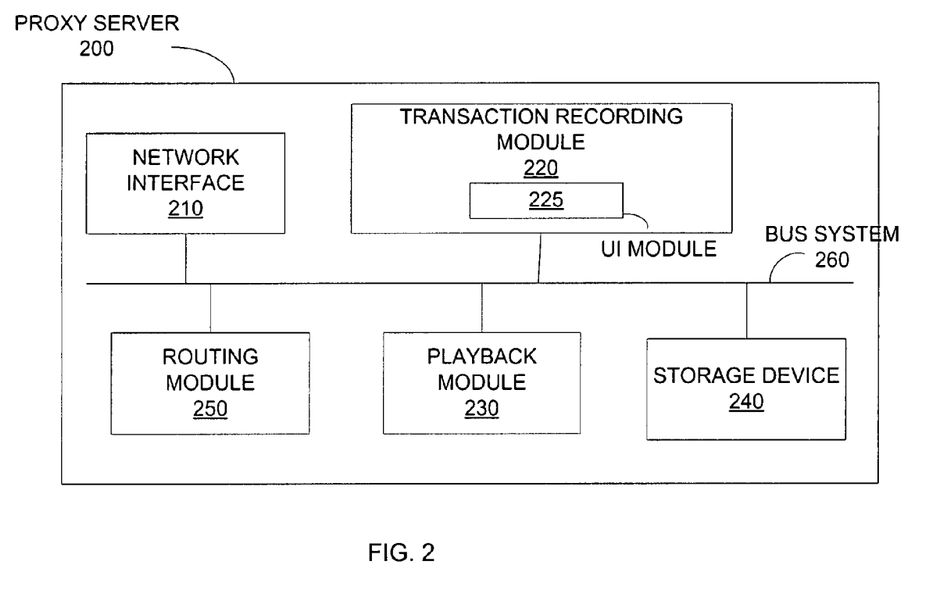
FIG. 2 illustrates a functional block diagram of one embodiment of a proxy server.

FIG. 2 illustrates a functional block diagram of one embodiment of a proxy server. The proxy server 200 may be implemented on a computing device, such as the one described below with reference to FIG. 4. The proxy server 200 includes a network interface 210, a transaction recording module 220, a playback module 230, a storage device 240, and a routing module 250, which are operatively coupled to each other via a bus system 260. The transaction recording module 220 further includes a user interface module 225.

In some embodiments, the network interface 210 communicatively couples to a network, which may include an intranet, an Internet, etc. Via the network, the network interface 210 receives and sends responses and requests to a client and a web server. The routing module 250 of the proxy server 200 routes the responses and requests to the client and/or the web server. In response to a request from the client to initiate transaction recording, the transaction recording module 220 performs various operations to start recording transactions. In some embodiments, the request may include an URL of a web application and the routing module 250 translates the URL so that the URL resolves to the proxy server 200. The user interface module 225 may generate, or cause the client to generate, a user interface (e.g., the second browser window 152 shown in FIG. 1C). The user may perform various operations to carry out a web transaction against the web application via the user interface, such as submitting requests to access various web pages and entering data. The transaction recording module 220 records the particular sequence of web pages accessed and data sent from the client to the web server, such as data entered by the user via the second browser window (e.g., credentials of the user). Then the network interface 210 passes the requests and/or data from the user to the web server. When the network interface 210 receives responses from the web server, the routing module 250 may translate the URLs in the response if needed. Then the user interface module 225 presents the new webpage via the user interface. The above operations may repeat during the web transaction. As such, the user may access the web application via the user interface while the proxy server 200 records information of the web transaction.

Since the proxy server 200 records transaction information behind the client, the user does not have to install or maintain any plugin to the network access application (e.g., a browser) on the client. Therefore, the above approach is more convenient for the client. Further, the above approach is independent of the type of browsers being executed on the client. In other words, the above approach is not browser-specific Thus, the user does not have to be concerned about incompatibility when switching to a different type of browser.

When the user desires to terminate transaction recording, the user may submit a request via a user interface control (such as the STOP button 164 illustrated in FIG. 1D) to the proxy server 200. In response to the user's request, the transaction recording module 220 terminates the recording. In some embodiments, the transaction information recorded is stored in the storage device 240 within the proxy server 200. Alternatively, the transaction information recorded is sent to a database server (e.g., the database server 132 in FIG. 1A) to be stored in a database external to the proxy server 200 (e.g., the database 135 in FIG. 1A).

The transaction information recorded may be used to play back the web transaction. In some embodiments, the proxy server 200 includes a playback module 230 to play back the web transaction based on the transaction information recorded. The playback module 230 may retrieve the transaction information from the storage device 240 and/or from the database external to the proxy server 200. Since the transaction information includes the addresses of web pages accessed during the web transaction and the order in which the web pages have been accessed, the same web pages may be accessed in the same order during a replay of the web transaction. Furthermore, the transaction information also includes the data entered by the user during the web transaction, and thus, the playback module 230 may provide substantially the same data to the web server 130A during the playback. As such, the web transaction may be repeated in substantially the same manner as the web transaction has occurred during the recording earlier. Alternatively, the above playback may be performed by a web agent being executed on a server separate from the proxy server 200.

Figure 3:
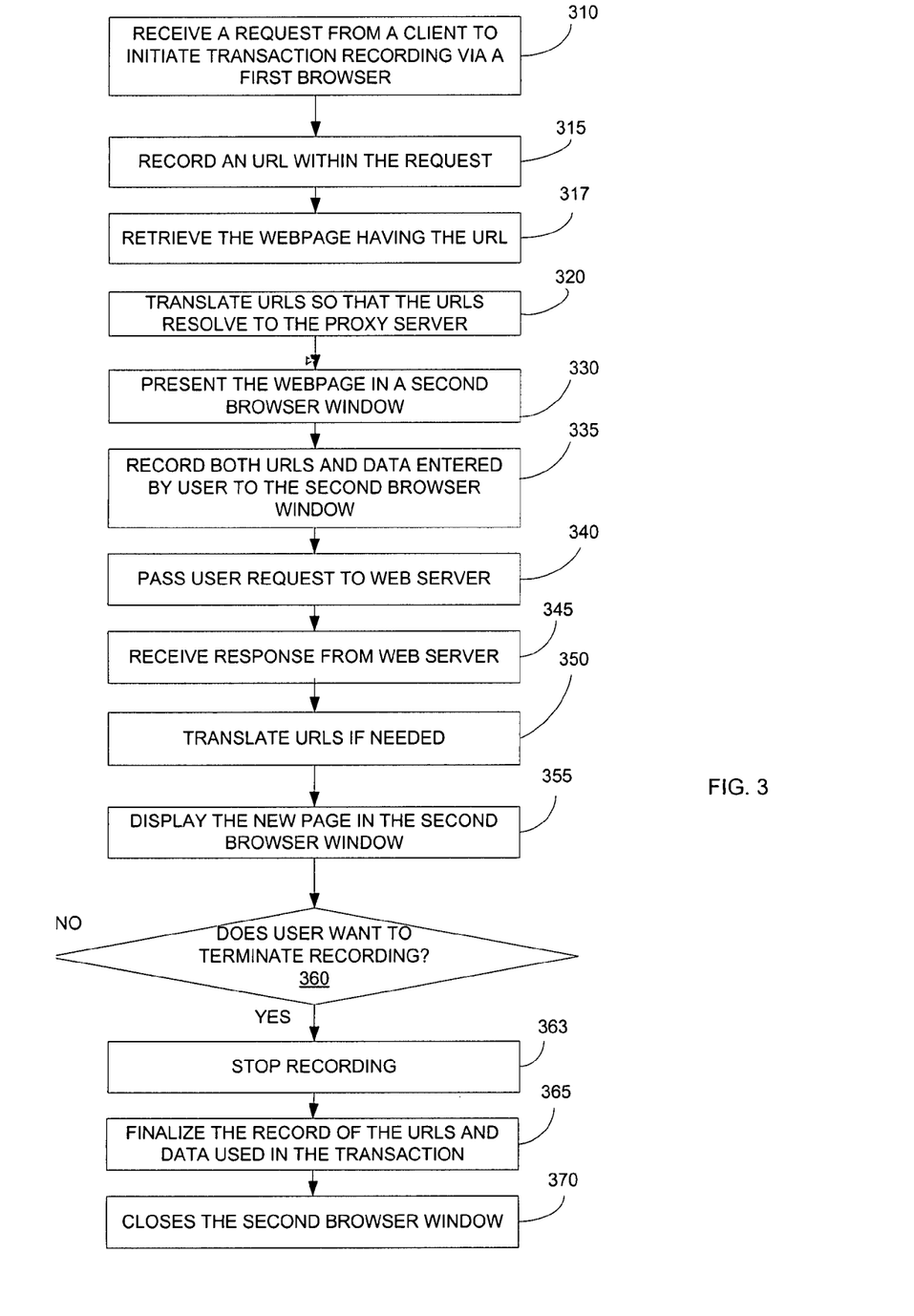
FIG. 3 illustrates a flow diagram of one embodiment of a process to record web transactions in a proxy server.

FIG. 3 illustrates a flow diagram of one embodiment of a process to record a web transaction using a proxy server communicatively coupled between a client and a web server. The process may be performed by processing logic that may comprise hardware (e.g., circuitry, dedicated logic, programmable logic, microcode, etc.), software (such as instructions run on a processing device), firmware, or a combination thereof. For example, the proxy server 200 in FIG. 2 may perform at least part of the process in some embodiments.

In some embodiments, processing logic at the proxy server receives a request from a client to initiate transaction recording via a first browser (processing block 310). For example, the client may submit the request via a browser window like the browser window 142 illustrated in FIG. 1B. An URL of a web application may be submitted with the request. Then processing logic records the URL within the request (processing block 315) and retrieves the webpage having the URL from the web server (processing block 317). During the web transaction between the client and the web server, processing logic translates URLs in webpages accessed during the web transaction so that the URLs resolve to the proxy server (processing block 320). Processing logic presents the webpages in a second browser window, such as the browser window 152 illustrated in FIG. 1C (processing block 330). Further, processing logic records both the URLs and data entered by the user to the second browser window during the web transaction (processing block 335). Processing logic passes user requests to the web server (processing block 340). Processing logic also receives responses from the web server (processing block 345). Depending on the responses, processing logic may translate URLs if needed (processing block 350). Then processing logic displays a new webpage in the second browser window accordingly (processing block 355).

Processing logic checks if the user wants to terminate recording in processing block 360. If not, processing logic transitions back to processing block 330 and repeat the above operations. Otherwise, processing logic stops recording (processing block 363) and finalizes the record of the URLs and data used in the transaction (processing block 365). Finally, processing logic closes the second browser window (processing block 370).

Figure 4:
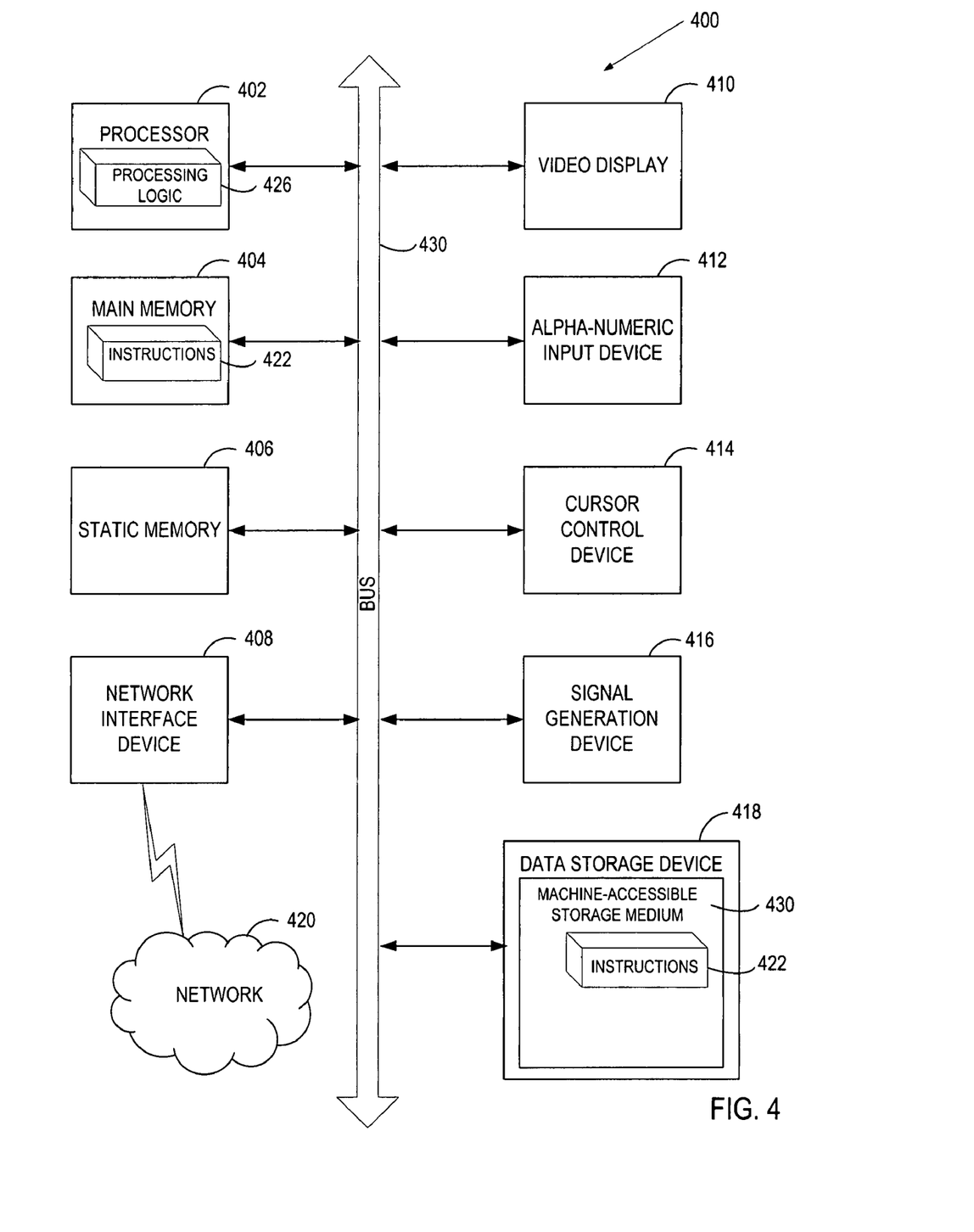
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a method and an apparatus to record web transactions using a proxy server have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
receiving, at a proxy server, a request from a first browser interface of a client computing device to record a web transaction with a web application provided by a web server, wherein the request includes a uniform resource locator (URL) of the web application;
in response to the request to record, causing a second user interface to open on the client computing device;
presenting a web page of the URL of the web application on the second browser interface;
routing, by a proxy server, responses and requests between the web application and the second browser interface during the web transaction, wherein routing responses and requests comprises translating URLs in web pages accessed during the web transaction so that the URLs resolve to the proxy server;
recording transaction information of the web transaction by the proxy server, wherein the proxy server is a different machine than the client computing device;
storing the transaction information in a storage device coupled to the proxy server; and
playing back, by a web agent executed on a server different from the proxy server and the client computing device, the web transaction with the web application provided by the web server based on the transaction information recorded.

2. The method of claim 1, wherein recording the transaction information by the proxy server comprises recording, by the proxy server, data input by a user at the second browser interface of the client computing device.

3. The method of claim 1, further comprising generating, by a user interface module running on the proxy server, the first browser interface to allow a user of the client computing device to initiate and to terminate said recording of the transaction information.

4. The method of claim 1, wherein said storing comprising storing, by the proxy server, the transaction information in a database managed by a database server coupled to the proxy server.

5. The method of claim 1, wherein the transaction information comprises credentials of a user of the client computing device.

6. The method of claim 5, wherein the credentials comprise a username and a password.

7. A system comprising:
a proxy server to receive a request from a first browser interface of a client computing device via a network to record a web transaction with a web application provided by a web server, the request including a uniform resource locator (URL) of the web application, to cause a second user interface to open on the client computing device in response to the request to record, to present a web page of the URL of the web application on the second browser interface over the network, to route responses and requests between the web application and the second browser interface via the network during the web transaction, wherein the proxy server is a different machine than the client computing device and wherein routing responses and requests comprises translating URLs in web pages accessed during the web transaction so that the URLs resolve to the proxy server, and to record transaction information of the web transaction, and to store the transaction information; and
a web agent executed on a server different from the proxy server to play back the web transaction with the web application provided by the web server based on the transaction information recorded.

8. The system of claim 7, wherein the transaction information comprises data input by a user second browser interface of the client computing device.

9. The system of claim 7, wherein the proxy server is further to generate the first browser interface to allow a user of the client computing device to initiate and to terminate the recording of the transaction information.

10. The system of claim 7, wherein the transaction information includes addresses of web proxy server pages accessed by the second browser interface of the client computing device.

11. The system of claim 7, wherein the proxy server is to include a network interface to communicatively couple the proxy server to the network.

12. The system of claim 7, further comprising the web server.

13. The system of claim 7, further comprising a database server communicatively coupled to the proxy server, to manage a database, wherein the proxy server sends the transaction information to the database server to store the transaction information in the database.

14. A machine-readable medium that provides instructions that, if executed by a processor, will cause the processor to perform operations comprising:
   receiving, at a proxy server, a request from a first browser interface of a client computing device to record a web transaction with a web application provided by a web server, wherein the request includes a uniform resource locator (URL) of the web application;
   in response to the request to record, causing a second user interface to open on the client computing device;
   presenting a web page of the URL of the web application on the second browser interface;
   routing, by a proxy server, responses and requests between the web application and the second browser interface during the web transaction, wherein routing responses and requests comprises translating URLs in web pages accessed during the web transaction so that the URLs resolve to the proxy server;
   recording transaction information of the web transaction by the proxy server, wherein the proxy server is a different machine than the client computing device;
   storing the transaction information in a storage device coupled to the proxy server; and
   playing back, by a web agent executed on a server different from the proxy server and the client computing device, the web transaction with the web application provided by the web server based on the transaction information recorded.

15. The machine-readable medium of claim 14, wherein recording the transaction information using the proxy server comprises using the proxy server to record data input by a user at the second browser interface of the client computing device.

16. The machine-readable medium of claim 14, wherein the operations further comprise generating the first browser interface to allow a user of the client computing device to initiate and to terminate said recording of the transaction information.

17. The machine-readable medium of claim 14, wherein wherein said storing comprises storing the transaction information in a database managed by a database server coupled to the proxy server.

18. The machine-readable medium of claim 14, wherein the transaction information comprises credentials of a user of the client computing device.

* * * * *